F. R. Van Dake,
Fruit Crate.
No. 99,977.                    Patented Feb. 15, 1870.
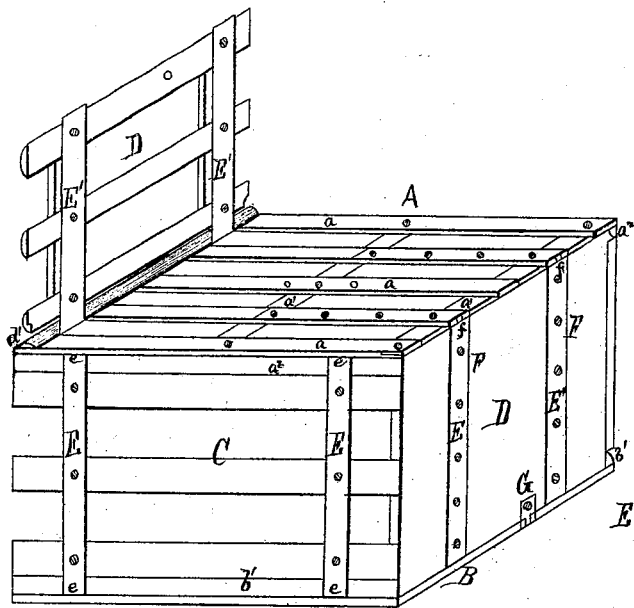
FIG: 1.
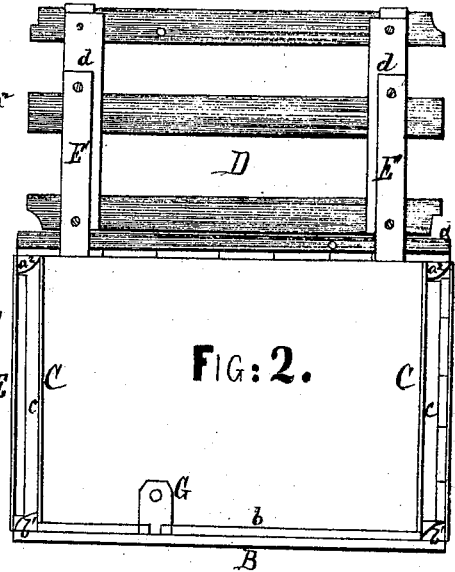
FIG: 2.
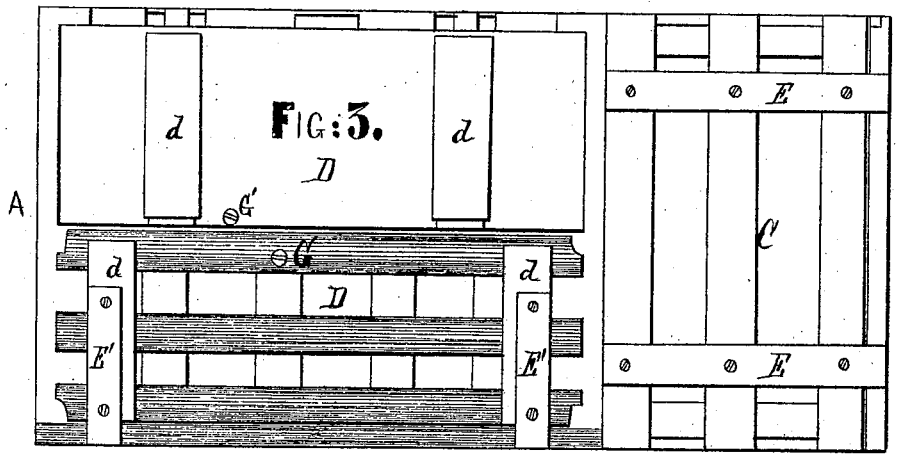
FIG: 3.
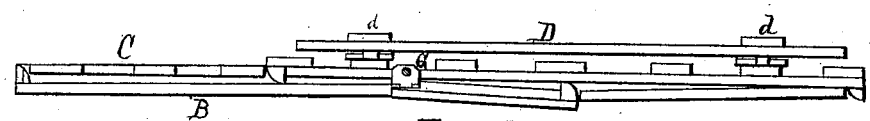
FIG: 4.
WITNESSES.
Edwin James
H. G. Hilmead
INVENTOR.
Frank R. Van Dake.
per J. E. F. Holmead.
Attorney.

United States Patent Office.

FRANK R. VAN DAKE, OF JACKSON, MISSISSIPPI.

Letters Patent No. 99,977, dated February 15, 1870.

IMPROVEMENT IN FOLDING CRATES.

The Schedule referred to in these Letters Patent and making part of the same.

*To all whom it may concern:*

Be it known that I, FRANK R. VAN DAKE, of Jackson, in the county of Hinds, and State of Mississippi, have invented certain new and useful Improvements in Folding Boxes or Crates; and I do hereby declare that the following is a full, clear, and exact description of the same, reference being had to the accompanying drawing and to the letters of reference marked thereon, making part of this specification, in which—

Figure 1 is a side view of the box or crate, with one end piece or gate in position, and the other elevated.

Figure 2 is an end view of the box opened.

Figure 3 is a top plan view of the box or crate closed.

Figure 4 is a side view of the box or crate closed.

The object of my present invention is to produce a box or crate for the reception and transportation of fruit, vegetables, eggs, poultry, &c., constructed in such manner that when not in use it can readily be so folded that it will occupy but little space—no more, indeed, than what is required by the thickness of the material used in its manufacture.

The nature of my invention consists in constructing the box or crate partially of boards and partially of slats, as shown in the present drawing; or, if desired, the entire box or crate may be constructed of boards; the sides and ends may be all barred or grated.

The top and bottom, sides, and end pieces are so connected as to provide, as it were, a system of hinged joints throughout the entire box, and the same working in such manner that under all circumstances the opposite sides of the box shall be always parallel.

The box or crate is firmly secured by straps and bands, and the hinges for the connecting joints can readily be formed, if desired, by simply looping the ends of these bands.

When the box is "set up" it is braced and held in a fixed position by simply letting one of the gates drop, which enters and fits between the sides so as to completely close that end of the box.

The fruit or other article to be shipped or transported is then placed in the box or crate, and the remaining gate is then brought in position, and both gates securely fastened by means of a hasp or other equivalent device. These hasps are so arranged, in connection with the folding sections of the box, as to be readily made to perform a double office; that is, they protect the contents of the box when the same is filled, and they also serve as a convenient means of fastening the different pieces together when folded, thus securely guarding the same against breakage, of which there is always more or less danger when the different sections are left loose.

The gates are so attached, by a loop in the end of the brace, band, or other hinge, either directly to the top or to a bearing bar secured thereto, as to allow of their utmost freedom of movement. These gates may be attached so as to fold either inwardly or outwardly; and being the only brace or support that retains the sides in an upright position, so soon as they are thrown out the box falls.

When the box or crate is to be used for the transportation of fruit the inner surface of the slats are so beveled as to be nearly semi-circular. By this simple arrangement the fruit is saved much bruising.

To enable others skilled in the art to make and use my invention, I will now proceed to describe its construction and operation.

The box or crate may be of any desired dimensions or proportions, of any convenient form, and constructed of any suitable material.

The top A, as shown in the drawing, is of a grate-form, consisting of slats, $a$ $a$ and cross-slats, $a'$ $a'$, securely nailed or otherwise fastened together. Or, if preferred, the top A may be constructed of board, as is the bottom B; or, *vice versa*, the bottom B may be composed of slats.

Around the edges of the inner surface of the bottom B, I secure strips, $b$ $b'$. The strips $b$ $b$, which are at the ends of the box, serve as bearings for the gates to rest against, preventing them from being swung too far in, and also retaining them in a perpendicular position when the box is "set up" and closed.

To the side strips $b'$ $b'$ the lower edge of the sides C C are hinged, their upper edges being in like manner secured to a bar or strip, $a^2$ $a^2$, secured to the under surface of the top A. These sides C C, as well as the gates or end pieces D D, may be made of slats or boards. In the drawing both styles are represented.

The sides C C are provided with bars, $c$ $c$, and the gates D D with brace-bars, $d$ $d$. When the sides and gates are constructed of boards these bars serve to strengthen the same, and when constructed of slats they serve as convenient means for securing the same together. In either case they assist in so holding the surfaces of the brace-band E apart as to afford the loop-ends $e$ $e$ for the hinge-joint connection.

E E are the brace-bands, and may be constructed of any suitable material. I usually form them of the same quality of metal that is used in securing the dry-goods box or package. These bands E E are secured to the sides C C, near their ends, and encircle their entire surface, the loop-ends $e$ $e$ passing over the strips $a^2$ $a^2$ $b'$ $b'$, forming a cheap, convenient, and durable joint. The upper surface of these strips $a^2$ $a^2$ $b'$ $b'$ is so rounded as to allow of the utmost freedom of movement to the sides.

The end pieces or gates D D are secured by bands, E' E', in like manner.

If desired, a bar, $d'$, may be secured on the upper surface of the box or crate, and the looped ends of the brace-bands E' E' of the gates D D may be secured over the same.

Instead of connecting the gates D D in this manner, the brace-bands E' E' may be of the style shown at F F, fig. 1, and so jointed at $f\,f$ as to form the hinge-joint connection.

G G are hasps, and serve not only to secure the box when "set up" and filled, but also to so fasten the different sections together, when closed, as to form, as it were, one compact piece, as clearly shown in figs. 3 and 4.

I have thus given a full and detailed description of the plan by which the box or crate is constructed, and it will be observed that the opposite sides of the box are always parallel, so that when the box is folded its width is increased the height of the box. It can, however, be so arranged that the length, and not the width, shall be thus increased, without altering at all the principle involved in its construction:

The operation is as follows:

The box or crate being in the position shown in figs. 1 and 2, is ready for the reception of the articles to be shipped, one of the gates being elevated and the other closed, and firmly bracing the box so that it is impossible for it to fall. After the box has been filled, the other gate is closed, and secured by the hasp G, or other equivalent device.

The contents are removed by simply unfastening the hasp G and elevating one of the gates. So soon as the box has been emptied the other gate is thrown out, when, there being no other stay or brace remaining, the box instantly falls, increasing in width the actual height of the box, in which position the hasps G G and screws G' G' securely lock the different sections together, as clearly shown in figs. 3 and 4.

Having thus fully described my invention,

What I claim therein as new, and desire to secure by Letters Patent of the United States, is—

The top A, bottom B, sides C C, and gates D D, brace-bands E E E' E' and hasps G G, when the latter are so arranged as to furnish a folding crate that can be secured thereby, either in the crate form or folded as a package, substantially as described.

In testimony whereof, I have signed my name to this specification in the presence of two subscribing witnesses.

FRANK R. VAN DAKE.

Witnesses:
JAMES PRIESTLEY,
T. L. HUGHES.